(12) United States Patent
Coleman et al.

(10) Patent No.: US 9,538,014 B2
(45) Date of Patent: Jan. 3, 2017

(54) USING AN IVR TO REMOTELY OPERATE SECURITY SYSTEMS

(75) Inventors: Chris Coleman, Centereach, NY (US); William R. Blum, Huntington Station, NY (US); Philip J. Ferro, Setauket, NY (US)

(73) Assignee: HONEYWELL INTERNATIONAL INC., Morristown, NJ (US)

( * ) Notice: Subject to any disclaimer, the term of this patent is extended or adjusted under 35 U.S.C. 154(b) by 1011 days.

(21) Appl. No.: 12/109,818

(22) Filed: Apr. 25, 2008

(65) Prior Publication Data

US 2009/0268884 A1 Oct. 29, 2009

(51) Int. Cl.
*H04M 1/64* (2006.01)
*H04M 11/04* (2006.01)

(52) U.S. Cl.
CPC ................................. *H04M 11/04* (2013.01)

(58) Field of Classification Search
CPC .................................................... H04M 11/04
USPC .................... 379/88.04; 340/539.18, 426.16
See application file for complete search history.

(56) References Cited

U.S. PATENT DOCUMENTS

| | | | |
|---|---|---|---|
| 5,195,130 A * | 3/1993 | Weiss ........................ | G06F 8/60 379/110.01 |
| 6,975,220 B1 | 12/2005 | Foodman et al. | |
| 7,113,090 B1 * | 9/2006 | Saylor .............. | G08B 13/19682 340/5.33 |
| 7,679,503 B2 | 3/2010 | Mason et al. | |
| 7,852,200 B2 | 12/2010 | Romanczyk et al. | |
| 2002/0005894 A1 | 1/2002 | Foodman et al. | |
| 2004/0086091 A1 | 5/2004 | Naidoo et al. | |
| 2004/0123149 A1 | 6/2004 | Tyroler | |
| 2005/0216302 A1 | 9/2005 | Raji et al. | |
| 2005/0280529 A1 | 12/2005 | Hinkson et al. | |
| 2006/0003775 A1 * | 1/2006 | Bull ...................... | G01S 5/0205 455/456.1 |
| 2006/0238314 A1 | 10/2006 | Minassian et al. | |

(Continued)

FOREIGN PATENT DOCUMENTS

WO WO 00/36812 A1 6/2000

OTHER PUBLICATIONS extended European search report from related EP patent application 08102582.7, dated Jun. 16, 2009.

(Continued)

*Primary Examiner* — Van D Huynh
(74) *Attorney, Agent, or Firm* — Husch Blackwell LLP

(57) ABSTRACT

The inventive method for remotely maintaining and controlling a security system comprises using a device to communicate using voice capable technology with an IVR in a host facility, selecting an action from a plurality of actions provided by the IVR, performing the action on the security system, and receiving a notification of performance of the action, wherein the host facility contacts the security system to perform the action. In one embodiment, the actions can control and/or monitor the security system. The method can further comprise creating an account with an identification code on the host facility and validating the code on the IVR. The method can also include translating the selected action into a command, sending a message to a GSM device in the security system, and, in response to the message, establishing a GPRS session between the security system and the host facility, wherein the session performs the command.

8 Claims, 2 Drawing Sheets

(56) References Cited

U.S. PATENT DOCUMENTS

2008/0042809 A1* 2/2008 Watts .................. B60R 25/1003
340/426.16
2008/0191861 A1 8/2008 Mason et al.
2008/0224846 A1 9/2008 Romanczyk et al.

OTHER PUBLICATIONS extended European search report from related EP patent application 08101541.4, dated Oct. 26, 2009.
Honeywell ADEMCO 8132/8132-i/8142/8142-i Symphony/ Symphony-i Advanced User Interface User Guide, Revision B, Honeywell, Syosset, New York, U.S., Dec. 2002.
Honeywell ADEMCO LYNXR/LYNXR24 Security System User Guide, Revision A, Honeywell, Syosset, New York, U.S., Apr. 2004.

* cited by examiner

USING AN IVR TO REMOTELY OPERATE SECURITY SYSTEMS

CROSS REFERENCE TO RELATED APPLICATION

This application is related to commonly-owned, co-pending U.S. patent application Ser. No. 11/705,659 filed on Feb. 13, 2007 and Ser. No. 11/686,110 filed on Mar. 14, 2007, the entire contents and disclosures of both of which are expressly incorporated by reference as if fully set forth herein.

FIELD OF THE INVENTION

This invention relates generally to controlling and monitoring security systems remotely through a communication system. In particular, this invention relates to operating security systems through the communication system using an interactive voice recognition (IVR) application that includes an audio capability to enhance user understanding of the security system's status.

BACKGROUND OF THE INVENTION

Security systems are used to monitor homes and businesses to prevent unwanted intrusions as well as to guard against natural disasters. Critical to the operation of such security systems is their arming and disarming. Generally, a security system is armed and disarmed using a keypad on a control panel residing within the structure that the system monitors. Traditional keypads can be wired into the system's control panel or can be wireless. In addition, virtual keypad applications providing remote access to the security system over the Internet, GSMs, LANs, or WANs are also available.

However, the present virtual keypad applications require, for access to a communication system, such as the internet, specific network-enabled equipment. Consequently, there is a need for a security system whose status can be determined and changed with a standard device or standard equipment, such as a telephone, instead of or in addition to specific network-enabled equipment.

SUMMARY OF THE INVENTION

The present invention advantageously provides a novel system and method for a security system owner to remotely control his or her security system by calling a hosted Interactive Voice Response (IVR) based system with a traditional telephone. Accordingly, landline, cellular, or any other technology that is voice capable can provide access to the security system. The inventive solution will be composed of a secure web site to store data, SMS technology, and GPRS technology to complete the action(s) submitted via the IVR system.

The inventive system and method for remotely maintaining and controlling a security system for securing a structure comprises the system comprising an IVR in a host facility, a device operable to communicate with the IVR using voice capable technology, and a plurality of actions provided by the IVR, wherein an action is selected from the plurality of actions, the host facility contacts the security system to perform the selected action, and a notification of performance of the selected action is provided by the IVR. In one embodiment, each of the plurality of actions is for controlling and/or monitoring the security system, wherein the controlling actions include arming and disarming, and wherein the monitoring actions comprise obtaining status. In one embodiment, an account storing an identification code can be created on the host facility, wherein the IVR validates the identification code. In addition, the system can also comprise a GSM device in the security system, wherein the selected action is translated into a command, a message is sent to the GSM device, and in response to the message, a GPRS session is established between the security system and the host facility, and the session performs the command.

BRIEF DESCRIPTION OF THE DRAWING

The invention is further described in the detailed description that follows by reference to the noted drawings by way of non-limiting illustrative embodiments of the invention in which like reference numerals represent similar parts throughout the drawings. As should be understood, however, the invention is not limited to the precise arrangements and instrumentalities shown. In the drawings.

The foregoing and other objects, aspects, features, and advantages of the invention will become more apparent from the following description and from the claims.

DISCLOSURE OF THE INVENTION

Figure 1:
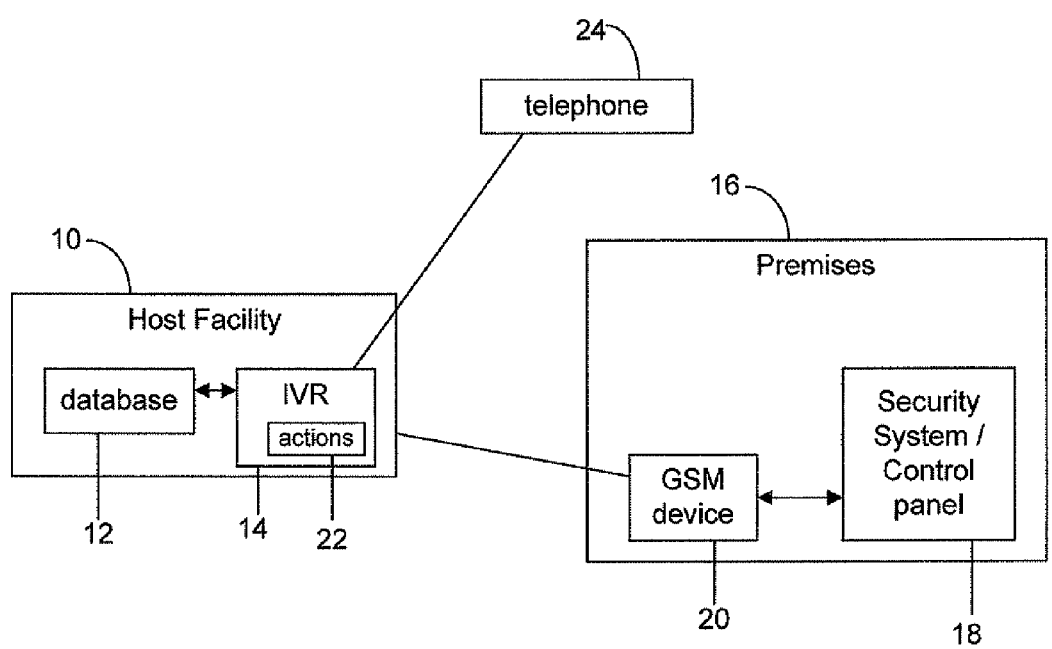
FIG. 1 is a schematic illustration of an exemplary embodiment of the present invention.

The inventive system enables a user (caller) to check and/or change the status of his security system without requiring the use of specific, network-enabled equipment. FIG. 1 schematically illustrates this inventive system. The system includes a secure web site or host facility 10 having a database 12 and an IVR system or IVR 14 and premises 16 secured by a security system having a control panel 18 and a GSM security device 20. The IVR 14 has a list of actions 22 such that each action 22 can be converted into a command operable on the security system 18. A telephone 24 can be used to access the system. The control panel can reside within the security system 18 as shown in FIG. 1 or can be separate.

The database 12 contains information regarding user accounts, including an account number, a personal identification number (PIN) as well as data associating the PIN with the user's account, and a GSM security device number as well as information describing the security system 18 and/or the control panel and its features. The database 12 is populated as users desire to participate in the inventive system. Initially, a person owning a security system 18, i.e., a user, sets up an account typically having an account number that is maintained in a database 12 at a host facility 10. As part of the set up process, the user establishes a unique personal identification number (PIN) that is associated with his account. This set up process can be performed by logging on to a secure web site belonging to the host facility 10.

Once connected or logged in, the user's credentials are authenticated. Then, the user can request a PIN of his choosing (and in accordance with criteria established by the host facility 10) or have one randomly generated by an application on the secure web site 10, and the PIN is assigned to the user. Once assigned, the PIN is stored in the database 12 described above. The PIN can be managed via a user's profile maintained at the host facility 10.

Figure 2:
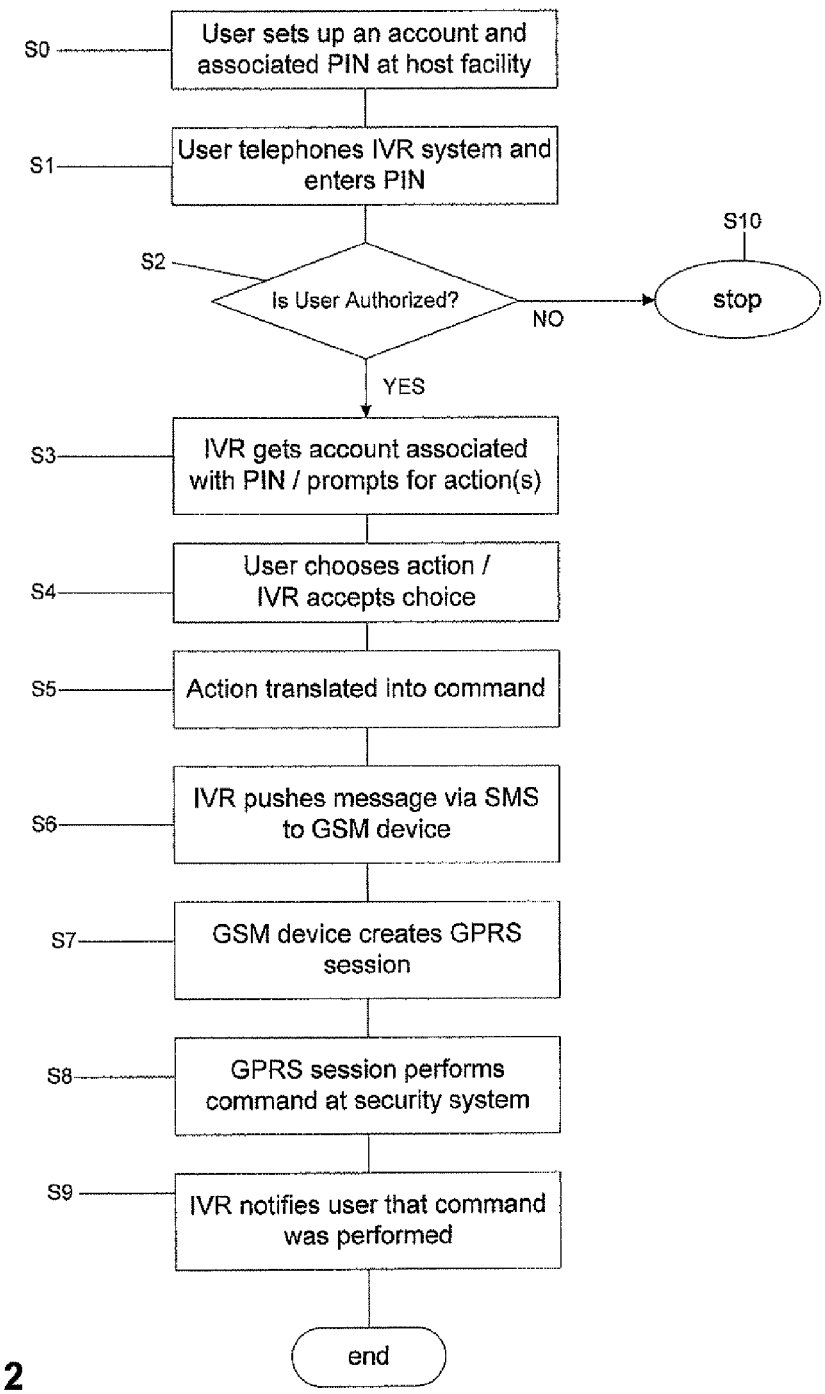
FIG. 2 is a flow diagram of the steps carried out by the exemplary embodiment of the present invention.

Operation of an exemplary embodiment of the inventive system is shown in the flow diagram of FIG. 2 in accordance with the system of FIG. 1. In step S0, a user sets up an account as described above, including establishing a PIN. When the user desires to review and/or modify his security system's status, in step S1, he places a telephone call, using a traditional telephone 24, to an IVR system 14 in the host facility 10. The call can be to a designated toll-free number hosted by the IVR system 14. Upon establishing a connection, the IVR system 14 prompts the caller for his unique PIN number. The user is authenticated in step S2 by validating the PIN using the database 12 on the host facility 10.

If the PIN is validated or accepted (S2=YES) in step S3, then the IVR system 14 will retrieve, from the database 12, the account associated with the PIN and will then prompt the caller with a list of possible action(s) to perform on his security system 18. These actions 22 can include arm, disarm, indicate status, etc. In step S4, an action 22 is selected by the caller and accepted, after validation, by the IVR system 14. Next, in step S5, the action 22 is translated into a command.

In step S6, the IVR 14 accesses the infrastructure of the host facility 10, asking it to send a message via SMS to the caller's GSM device 20, which is determined from the caller's PIN that is associated to the caller's account. As discussed above, the account is associated with the GSM device 20. In other words, the host facility 10, in accordance with its database 12, pushes an SMS message to the user's GSM security device 20. The GSM security device 20 "wakes up" in response to the SMS message and then creates a GPRS session back to its host facility 10 to accept the command initiated by IVR system 14.

In accordance with the GPRS session, the GSM security device 20 then communicates with its associated security control panel 18 and performs the command in step S8. The technology used is SMS for wireless devices and Ethernet for wired devices. In one embodiment, the SMS message uses the AT&T (USA) or Rogers (Canada) GSM network with which the host facility 10, e.g., Alarmnet Data Center, maintains private connectivity. The SMS message protocol to wake-up the devices is an "Empty" SMS message, which causes the GSM device 20 to contact or check-in with the host facility 10 via GRPS. Thus, the SMS message causes the GSM device 20 to establish a GPRS session for performing the command.

The GPRS session is caused or created based on the command selected via the list of actions 22 provided by the IVR 14. As discussed above, the selected action 22 has been converted or translated into a command operable on the security system's control panel 18. Hence, what happens during the GPRS session is based on the command requested by the user via the IVR 14. In one embodiment, the GPRS session is a wireless Ethernet connection between the GSM device 20, the GSM network, and the host facility 10.

Once action 22 by the GSM device 20 and control panel 18 is completed, that is, the command is successfully performed in step S8, the caller receives an automated voice response from the IVR 14 reporting the performance of the action 22 in step S9. Accordingly, the user can terminate the session by hanging up or disconnecting the telephone 24. In the alternative, if desired, the user can perform additional operations on his security system 18 by requesting another list of actions 22.

If the user is not authorized, for example, if the PIN is not valid, or the account is unavailable or not validated (S2=NO), then the process terminates at step 10.

The embodiments described above are illustrative examples, and it should not be construed that the present invention is limited to these particular embodiments. Thus, various changes and modifications may be effected by one skilled in the art without departing from the spirit or scope of the invention as defined in the appended claims.

What is claimed is:

1. A method for remotely maintaining and controlling a security system for securing a structure, comprising:
   a host facility that is separate from the structure, the host facility hosting a telephone number enabling a caller to check or change a status of the security system of the caller without requiring use of specific network-enabled equipment;
   the caller placing a call to the telephone number using a device;
   the caller using the device to communicate using voice capable technology with an interactive voice response (IVR) in the host facility;
   the caller selecting an action from a plurality of actions provided by the IVR;
   translating or converting the action into a command operable within a control panel of the security system;
   the host facility contacting the security system within the structure by pushing an empty short message service (SMS) message to a global system for mobile communication (GSM) device of the security system waking up the GSM device;
   the GSM device establishing a general packet radio services (GPRS) session with the host facility in response to the GSM device receiving the empty SMS message communicating with the control panel after establishing the GPRS session, receiving the command from the host facility after establishing the GPRS session, and performing the action on the security system based on the command, wherein the GSM device wakes up from a disabled state in response to the empty SMS message; and
   the IVR reporting performance of the action to the caller, the caller receiving an automated voice response from the IVR.

2. The method according to claim 1, wherein each of the plurality of actions is for one of controlling and monitoring the security system.

3. The method according to claim 2, wherein the plurality of actions for controlling comprises at least arm and disarm, and wherein the plurality of actions for monitoring comprises as least obtain status.

4. The method according to claim 1, further comprising:
   creating an account on the host facility and storing an identification code in the account; and
   validating the identification code on the IVR.

5. A system for remotely maintaining and controlling a security system for securing a structure, comprising:
   a host facility that is separate from the structure and that hosts a telephone number enabling a caller to check or change a status of the security system of the caller without requiring use of specific network-enabled equipment;
   an interactive voice response (IVR) in the host facility;
   a device that places a call to the telephone number to communicate with the IVR using voice capable technology; and
   a plurality of possible actions to be performed on the security system provided by the IVR to the caller, wherein a selected action is selected by the caller from the plurality of possible actions, wherein the host facility contacts the security system within the structure to perform the selected action by pushing an empty short message service (SMS) message to the security system, wherein the host family receives a notification of performance of the selected action, and wherein the notification is provided by the IVR to the caller;

a global system for mobile communication (GSM) device of the security system within the structure, wherein the GSM device establishes a general packet radio services (GPRS) session with an infrastructure of the host facility in response to the GSM device receiving the empty SMS message, wherein the GSM device communicates with a control panel of the security system after establishing the GPRS session, wherein the GSM device receives a command from the host facility after establishing the GPRS session, wherein the GSM device performs the selected action based on the command, and wherein the GSM device wakes up from a disabled state in response to the empty SMS message.

6. The system according to claim 5, wherein each of the plurality of possible actions is for one of controlling and monitoring the security system.

7. The system according to claim 6, wherein the plurality of possible actions for controlling comprises at least arm and disarm, and wherein the plurality of possible actions for monitoring comprises as least obtain status.

8. The system according to claim 5, further comprising:
an account on the host facility, said account storing an identification code, wherein the IVR validates the identification code.

* * * * *